(12) United States Patent
Qi et al.

(10) Patent No.: US 11,303,154 B2
(45) Date of Patent: Apr. 12, 2022

(54) HALF-HALF-BRIDGE PULSE WIDTH MODULATION LOW POWER MAGNETIC SECURE TRANSMISSION SYSTEMS

(71) Applicant: Integrated Device Technology, Inc., San Jose, CA (US)

(72) Inventors: Tao Qi, San Diego, CA (US); Gustavo Mehas, Mercer Island, WA (US); Rui Liu, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 117 days.

(21) Appl. No.: 16/368,791

(22) Filed: Mar. 28, 2019

(65) Prior Publication Data

US 2020/0220384 A1    Jul. 9, 2020

Related U.S. Application Data

(60) Provisional application No. 62/788,001, filed on Jan. 3, 2019.

(51) Int. Cl.
| | | |
|---|---|---|
| *H02J 50/10* | (2016.01) | |
| *H04B 5/00* | (2006.01) | |
| *H02M 7/219* | (2006.01) | |
| *H02J 7/02* | (2016.01) | |

(52) U.S. Cl.
CPC ............ *H02J 50/10* (2016.02); *H02M 7/219* (2013.01); *H04B 5/0037* (2013.01); *H02J 7/025* (2013.01)

(58) Field of Classification Search
CPC .......... H02J 50/10; H02J 7/025; H02M 50/10; H04B 5/0037
USPC .......................................................... 307/104
See application file for complete search history.

(56) References Cited

U.S. PATENT DOCUMENTS

| | | |
|---|---|---|
| 8,814,046 B1 | 8/2014 | Wallner |
| 9,697,450 B1 | 7/2017 | Lee |
| 10,116,294 B1 * | 10/2018 | Xu ........................ H03K 5/1536 |
| 2016/0149416 A1 | 5/2016 | Ha et al. |
| 2019/0012586 A1 * | 1/2019 | Liu ....................... H04B 5/0031 |
| 2019/0214719 A1 * | 7/2019 | Lee ......................... H01F 38/14 |

OTHER PUBLICATIONS

International Search Report and Written Opinion dated Sep. 27, 2018 issued in PCT App. No. PCT/US2018/041026 (13 pages).

* cited by examiner

*Primary Examiner* — Michael R. Fin
(74) *Attorney, Agent, or Firm* — Haynes and Boone, LLP

(57) ABSTRACT

According to some embodiments, a magnetic secured transmission (MST) driver is provided. The MST driver includes a full-bridge switching circuit that includes a first half-bridge coupled to a first node and a second half-bridge coupled to a second node; and a control circuit coupled to drive the first half-bridge according to MST input data and to drive the second half bridge according to a high-frequency pulse width modulation (PWM) signal.

18 Claims, 7 Drawing Sheets

HALF-HALF-BRIDGE PULSE WIDTH MODULATION LOW POWER MAGNETIC SECURE TRANSMISSION SYSTEMS

CROSS-REFERENCE

This application claims the benefit, under 35 U.S.C. § 119(e), of commonly-owned U.S. provisional application No. 62/788,001, filed on Jan. 3, 2019, which is hereby expressly incorporated herein by reference in its entirety.

This application is related to co-pending and commonly-owned U.S. non-provisional application Ser. No. 16/028,207, filed on Jul. 5, 2018, which in turn claims the benefit of commonly-owned U.S. provisional application No. 62/529,728, filed on Jul. 7, 2017.

The aforementioned applications are all hereby expressly incorporated herein by reference in their entirety.

TECHNICAL FIELD

Embodiments of the present invention are related to magnetic secured transmission (MST) technology and, in particular, to a driver circuit using half-half-bridge pulse width modulation (PWM) to provide MST communications.

DISCUSSION OF RELATED ART

Mobile devices, for example smart phones, tablets, wearables and other devices are increasingly being equipped with magnetic secured transmission (MST) communications systems. MST systems may be included, or incorporated with, wireless power transmission systems. MST uses a MST coil to communicate wirelessly between a transmitter and a receiver. The receiver may, for example, be a point-of-sale (POS) system that receives data through MST communications to affect payment.

However, power consumption to drive the MST coil can be significant at the transmitting device. When the transmitting device is a portable device such as a cell phone or PDA, the high-power consumption for the MST communication can impair battery duration of the device. In addition, conventional MST technology uses coil resistance to limit the coil current, resulting in high power loss at the coil and high cost due to the required large MST coils.

Therefore, there is a need to develop a power and cost-efficient MST system.

SUMMARY

In view of the need for a power and cost-efficient MST system, embodiments herein provide a magnetic secure transmission (MST) driver circuit. The MST driver circuit includes a first half-bridge component, a second half-bridge component coupled to the first half-bridge component to form a full-bridge component, and a control circuit. The control circuit is coupled to drive the first half-bridge component according to a MST input signal and drive the second half-bridge component according to a pulse width modulation (PWM) signal.

Embodiments described herein further provide a method for operating a MST driver circuit. The method includes driving, via a control circuit, a first half-bridge component according to a MST input signal. The method further includes driving, via the control circuit, a second half-bridge component coupled to the first half-bridge component that form a full-bridge component, according to a PWM signal.

These and other embodiments are discussed below with respect to the following figures.

These figures are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

In accordance with some embodiments of the present invention, a MST driver circuit including a first half-bridge of transistors and a second half-bridge of transistors is provided. Specifically, the two half-bridges are controlled by different switching signals, e.g., one half-bridge is controlled by a high-frequency PWM signal (~2 MHz, for example) for PWM control, and the other half-bridge is controlled by the MST input signal at the MST frequency (e.g., 500 Hz to 3 KHz). The coil current flowing through the MST coil switches directions according to the lower frequency of the MST input signal. The amplitude, slew rate of transition of the coil current can be controlled by the other half-bridge switching at a higher frequency under PWM control. The power efficiency is improved by using PWM control because there is no need for the traditional current limiting MST coil resistance which consumes high power (~8 W). Furthermore, the coil current can be controlled to transit from high to low, or low to high with a power saving slope to reduce power consumption at the MST coil. In this way, power efficiency of the MST driver circuit is further improved.

In addition, a wireless-power consortium (WPC) coil in the MST device can be used as the MST coil, e.g., a single coil can be used for MST communication or wireless power transfer. In this way, the cost of providing MST communications is reduced without extra hardware expense for a dedicated MST coil.

Figure 1A:
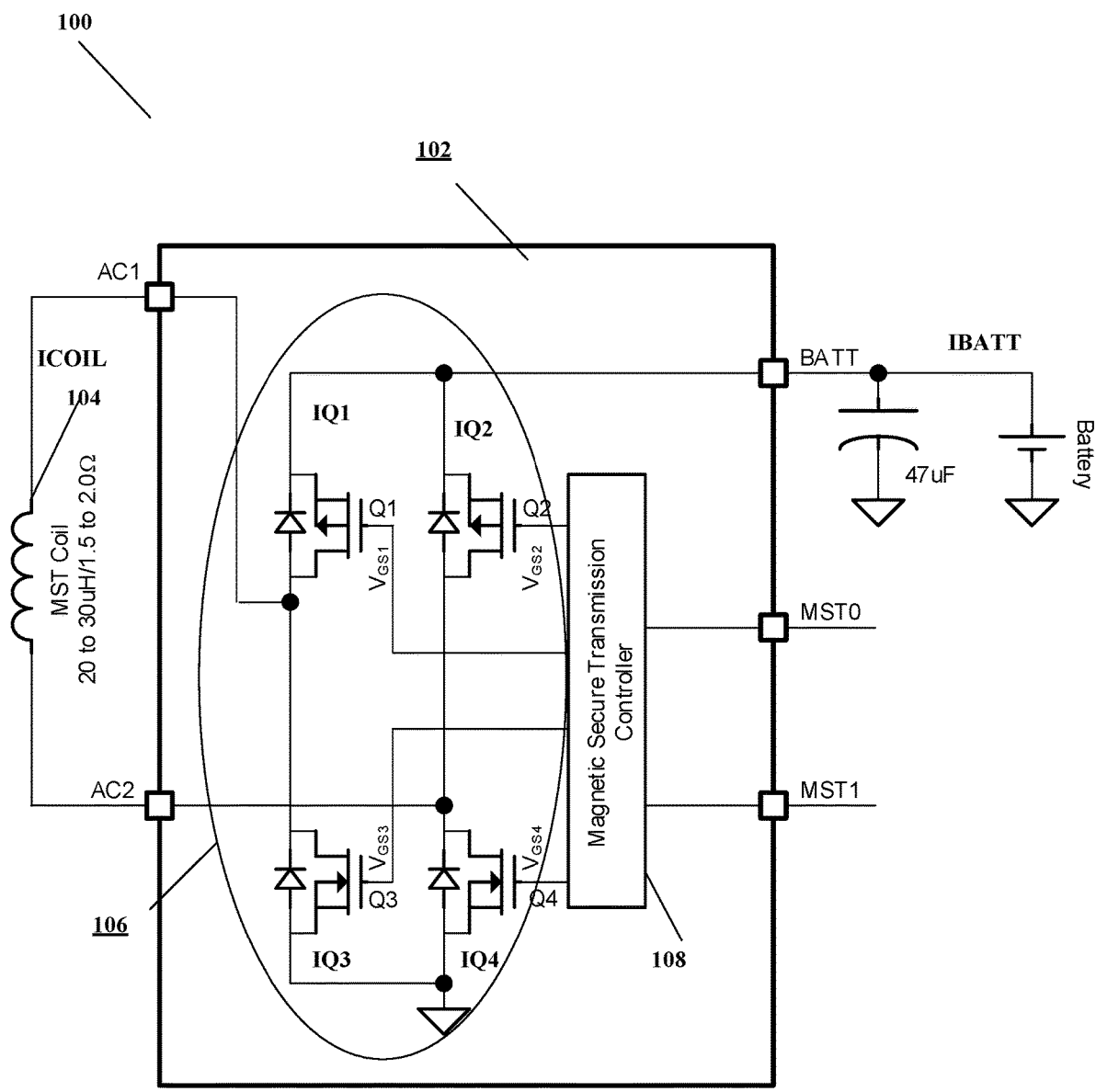
FIG. 1A illustrates a conventional MST topology.
Figure 1B:
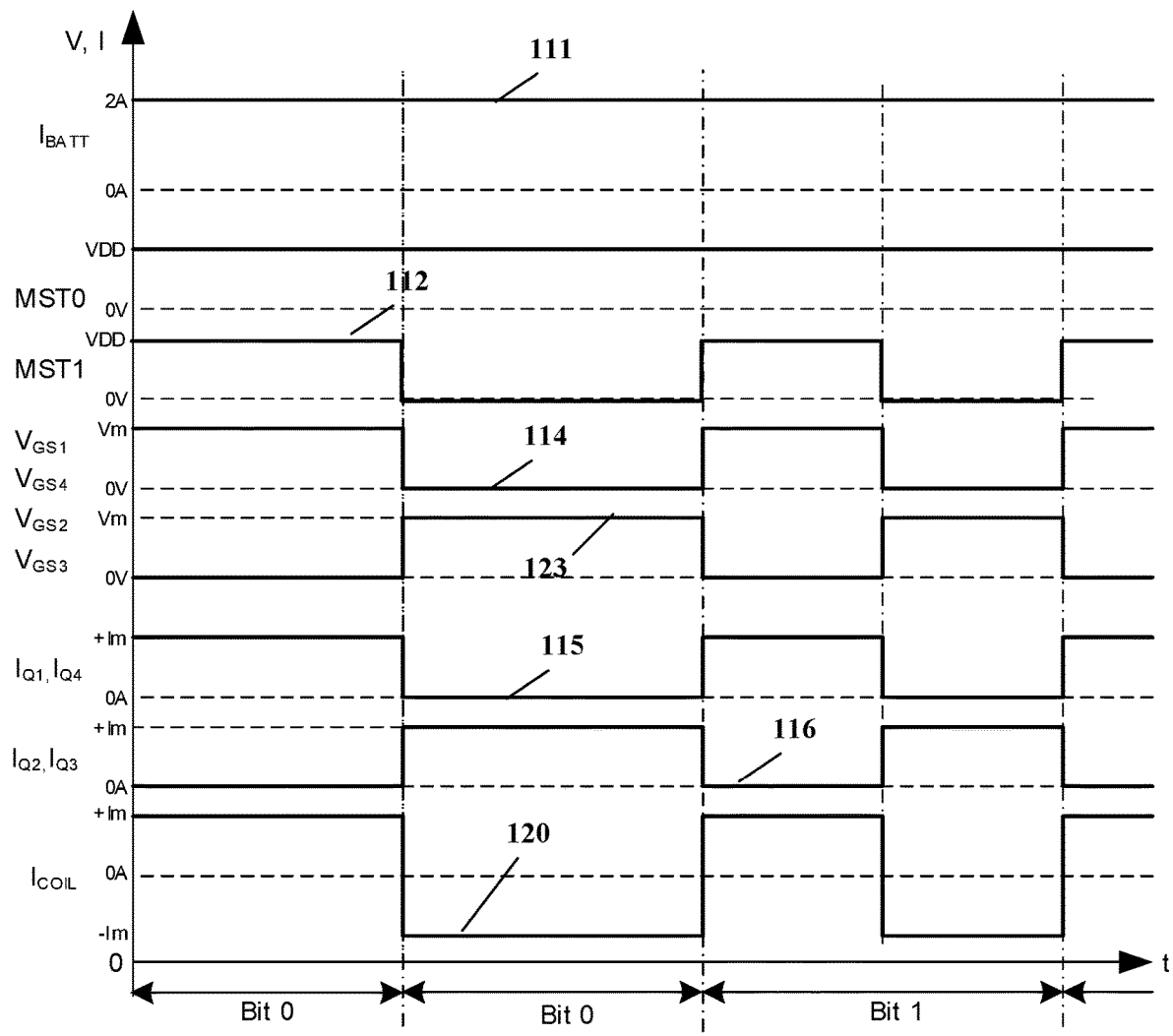
FIG. 1B shows various signal forms illustrating the operation of the conventional MST topology, according to embodiments described herein.

FIG. 1A illustrates a conventional MST topology, and FIG. 1B shows various signal forms illustrating the operation of the conventional MST topology, according to embodiments described herein. As illustrated in FIG. 1A, a MST coil 104 is coupled to and driven by a driver circuit 102. Driver circuit 102 includes a full-wave switching circuit 106 that includes transistor switches Q1, Q2, Q3, and Q4 controlled by MST controller 108. For example, FIG. 1B illustrates various signals as a first bit and a second bit are transmitted. The signals include the input current from the battery IBATT, shown at waveform 111; the input signals at MST0 and MST1, shown at waveform 112; the transistor gate voltages $V_{GS1}$, $V_{GS2}$, $V_{GS3}$, and $V_{GS4}$ corresponding to transistor switches Q1, Q2, Q3 and Q4, respectively, as shown at waveforms 114 and 123; the currents through the transistor switches $I_{Q1}$, $I_{Q2}$, $I_{Q3}$, and $I_{Q4}$ as shown at waveforms 115 and 116; and the current through the coil 104, as shown at waveform 120.

For example, as shown in FIG. 1B, transistor switches Q1 and Q4 are controlled by a gate voltage shown at waveform 114, and transistor switches Q2 and Q3 are controlled by an inversed version of the same gate voltage, shown at waveform 123. Thus, when transistor switches Q1 and Q4 are turned on, and transistor switches Q2 and Q3 is turned off, the current flows from AC1 to AC2 through MST coil 104. When transistor switches Q2 and Q3 are turned on and transistor switches Q1 and Q4 are turned off, then current flows through MST coil 104 in the opposite direction, from AC2 to AC1. In this way, the current that flows through MST coil 104 alternates the direction, as shown at waveform 120.

Consequently, data can be transmitted by switching the current in the MST coil 104 via controlling the gate voltages to transistor switches Q1-Q4.

The coil resistance of MST coil 104 is used to limit battery current IBATT (shown at waveform 111). The MST coil current $I_{COIL}$ is usually a function of battery voltage BATT. In order to maintain MST performance, the MST system is usually designed for a low battery operation voltage, resulting in more cost and more power consumption from the battery. For example, with a battery voltage BATT of 3.5 V and a resistance of MST coil 104 of 1.5Ω, the power consumption is 3.5V*3.5V/1.5 Ohm=8.2 W.

When the battery voltage is enhanced (e.g., 4.35V), unnecessary power loss is usually experienced at the coil 104, which reduces battery operation time and generates more heat, especially when used in wearable devices, such as smart watches. For example, an increase of the battery voltage to 4.35V battery voltage will result in a power loss of 12.6 W.

The battery current is usually the same as the peak current passing through MST coil 104. Such a current level can stress the battery during MST data transmission and may even cause battery failure when the peak current goes too high.

Figure 2A:
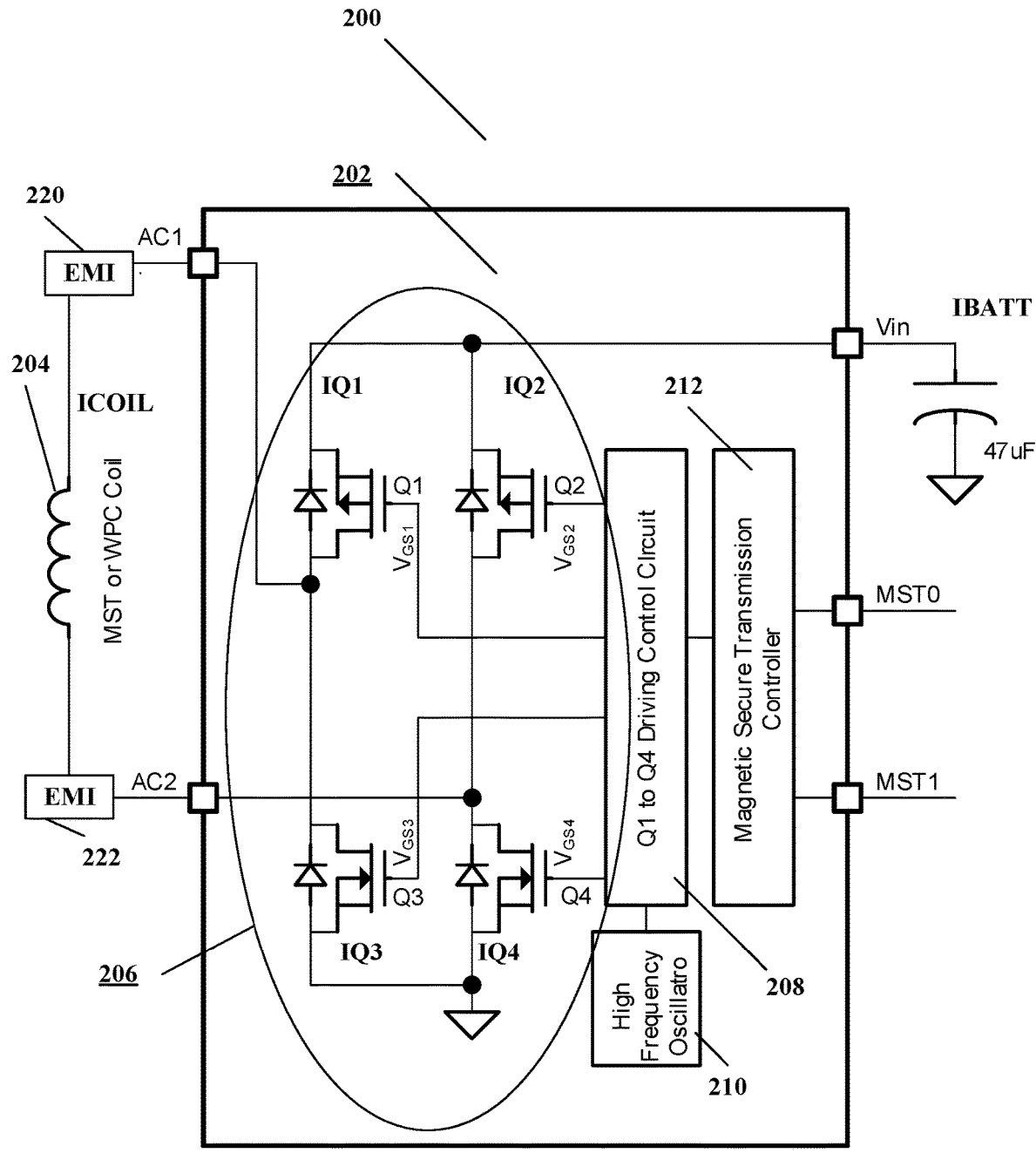
FIG. 2A illustrates a full-bridge pulse width modulation (PWM) topology.
Figure 2B:
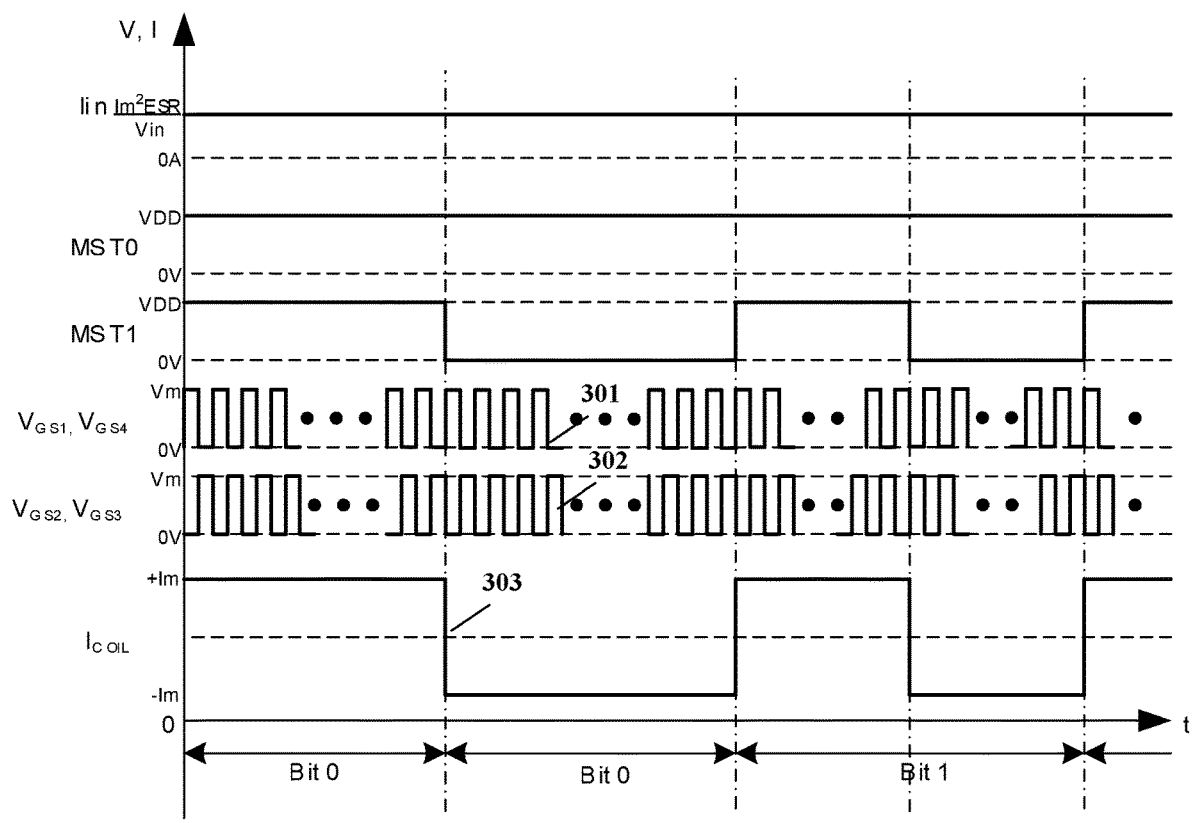
FIG. 2B shows various signal forms illustrating the operation of the PWM MST topology, according to embodiments described herein.

FIG. 2A illustrates a full-bridge pulse width modulation (PWM) topology 200, and FIG. 2B shows various signal forms illustrating the operation of the PWM MST topology, according to embodiments described herein. As illustrated in FIG. 2A, MST topology 200 includes a driver circuit 202, which may be a controller integrated circuit, that includes a full-bridge switching circuit 206 that includes transistor switches Q1, Q2, Q3, and Q4. The transistor switches Q1, Q2, Q3 and Q4 are controlled by a driving control circuit 208, which is coupled to a high-frequency oscillator 210 and a MST controller 212. MST controller 212 receives MST input signals MST0 and MST1.

The high frequency oscillator 210, together with the control circuit 208, is configured to drive the full bridge switching circuit (including transistors switches Q1 to Q4) at a much higher frequency, e.g., 1 to 2 MHz, than the driving signals (see waveforms 114 and 123) used in FIGS. 1A-1B. The MST frequency is about 500 Hz to 3 KHz, and PWM and/or phase shift control is introduced to regulate the coil current over a wide battery voltage range (2V to 4.5V). Low power MST operation can be achieved by adjusting PWM signal as no power-consuming current limit coil resistance is needed.

For example, FIG. 2B illustrates the high frequency gate voltages, shown at waveforms 301 and 302, applied to the gates of transistor switches Q1, Q2, Q3, and Q4. Similar to the transistor switches Q1-Q4 shown in FIG. 1A, the gate voltage (shown at waveform 301) is applied to transistor switches Q1 and Q4 and the inversed version of the same gate voltage (shown at waveform 302) is applied to transistor switches Q2 and Q3. In this way, an alternating current (shown at waveform 303) is generated at coil 204. Consequently, transistor switches Q1 and Q4, and transistor switches Q2 and Q3 are both switched at high frequency using the full-bridge topology. Additional details relating to the full-bridge PWM topology may be found in co-pending and commonly-owned U.S. non-provisional application Ser. No. 16/028,207, filed on Jul. 5, 2018, which is hereby expressly incorporated herein by reference in its entirety.

An advantage of MST topology 200 is that topology 200 uses only one coil (wireless power coil) which can be used as a wireless power coil or MST coil, when both wireless charging and MST functions are provided, resulting in lower coil cost. Furthermore, PWM and/or phase shift control can be used to precisely control the coil current to a desired amplitude as well as the slew rate to achieve constant MST performance and to save battery power. Low resistance MST coil or wireless power receiver coil can be used for MST function, resulting in much low power consumption during MST operation.

In FIG. 2A, as the voltages at both nodes AC1 and AC2 switch according to the high-frequency PWM control signal (shown at waveforms 301-302), resulting in electromagnetic interference (EMI) being produced at both nodes AC1 and AC2. Thus, two sets of EMI filters 220 and 222 are needed in topology 200 to reduce EMI at both nodes AC1 and AC2, respectively.

Figure 3A:
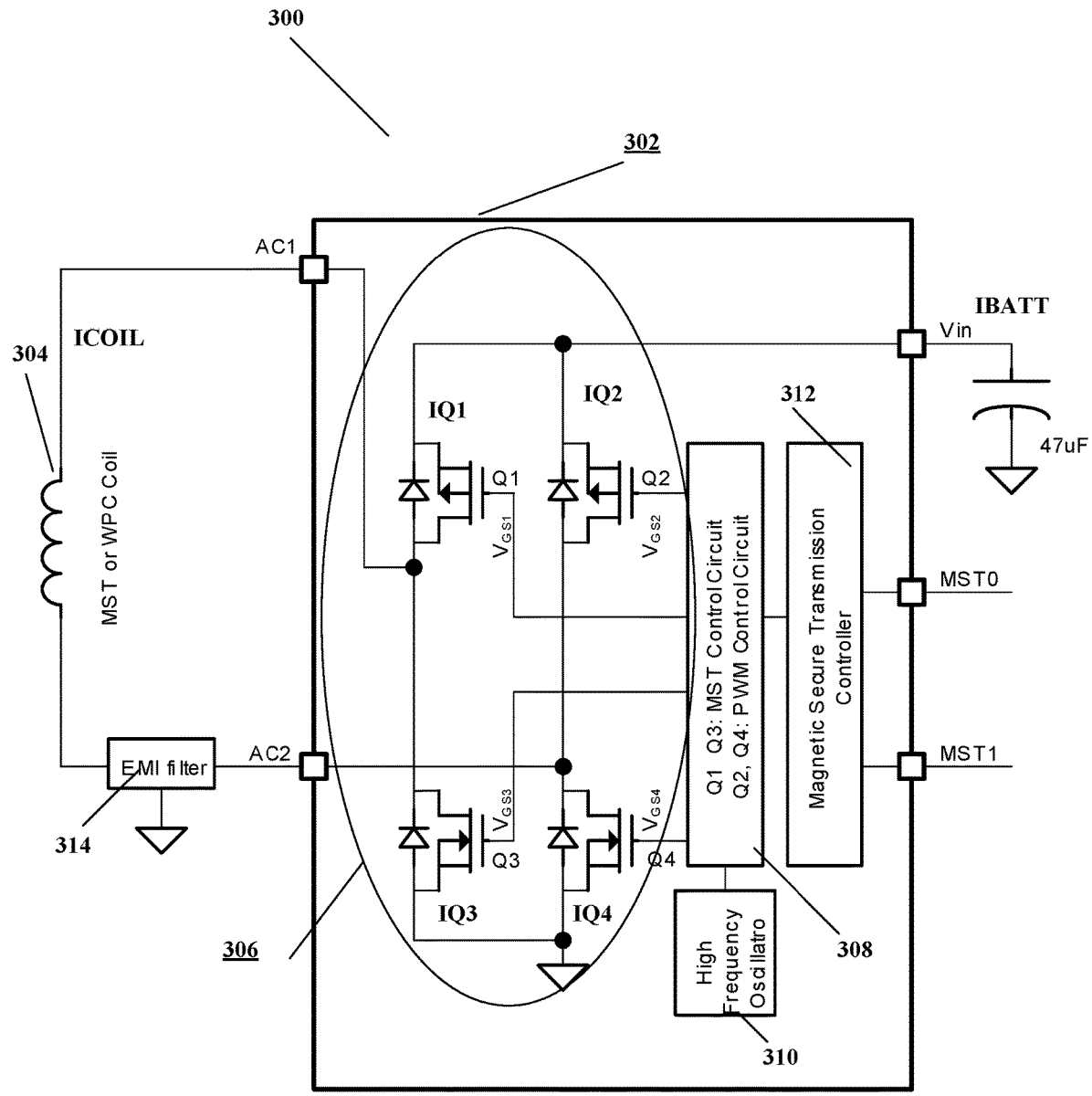
FIG. 3A illustrates a half-half-bridge MST topology.
Figure 3B:
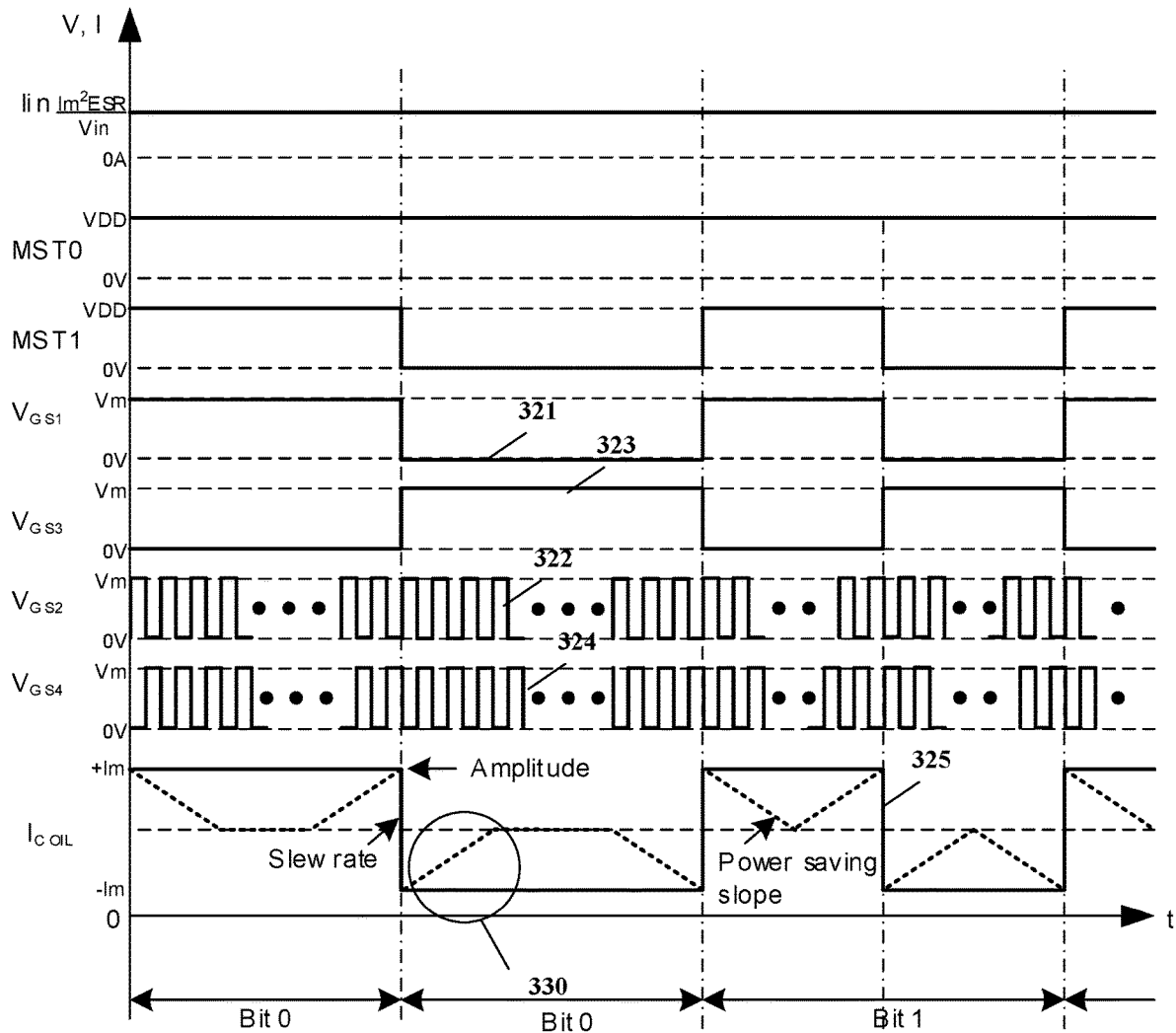
FIG. 3B shows various signal forms illustrating the operation of the MST topology, according to embodiments described herein.

FIG. 3A illustrates a half-half-bridge MST topology 300, and FIG. 3B shows various signal forms illustrating the operation of the MST topology 300, according to embodiments described herein. As illustrated in FIG. 3A, topology 300 including a coil 304 is driven by a driver circuit 302, which may be an integrated circuit chip. The driver circuit 306 includes a control circuit 302 includes a full-bridge switching circuit 306 coupled to a control circuit 308. A high frequency oscillator 310 and a magnetic secure transmission controller 312 are also coupled to control circuit 308. Control circuit 308 controls the gates of transistor switches Q1, Q2, Q3, and Q4.

In accordance with some embodiments, one half-bridge including transistor switches Q1 and Q3 is controlled by an MST input signal, and thus is switched at MST frequency (e.g., 500 Hz to 3 KHz). The other half-bridge of the full bridge switching circuit 306, including transistor switches Q2 and Q4 are controlled by a high-frequency PWM signal, and thus is switched at a higher frequency (e.g., 2 MHz). The high frequency oscillator 310 and the control circuit 308 are coupled to generate the high-frequency PWM signal.

FIG. 3B illustrates various voltages/currents in MST topology 300 according to the present invention. As is illustrates, transistor switch Q2 is controlled by a high-frequency PWM signal (shown at waveform 322), and transistor switch Q4 is controlled by an inversed version of the PWM signal (shown at waveform 324). Transistor switch Q1 is controlled by a MST input signal (shown at waveform 321), and transistor switch Q3 is controlled by an inversed version of the MST input signal (shown at waveform 323). In this way, the half-bridge of transistor switches Q2 and Q4 is switched at high frequency (~2 MHz, for example) for PWM control. The other half-bridge of transistor switches Q1, Q3 are operated at MST frequency (500 Hz to 3 KHz)

Specifically, when the MST input signal is high, transistor switch Q1 is on, and transistor switch Q3 is off, the voltage at node AC1 is equal to the input voltage Vin. The coil current flows from node AC1 to node AC2. When the MST input signal is low, transistor switch Q1 is off and transistor switch Q3 is on, the voltage at node AC1 is 0. The coil current flows from node AC2 to AC1. Thus, the coil current passing through the coil 304 alternates, as shown at waveform 325.

As the voltage at node AC2 is switched according to the high-frequency PWM signal, and the voltage at node AC1 is switched according to the much lower frequency of the MST input signal, only one EMI filter 314 is used at node AC2 to reduce EMI. No EMI filter is required at the AC1 node due to the relatively low switching frequency at node AC1 and thus the EMI may be negligible.

Transistor switches Q2 and Q4 are under PWM control. Consequently, transistors Q2 and Q4 are PWM controlled at high frequency so that the voltage on node AC2 may be used regulate the coil current amplitude and slew rate. The coil current can be controlled to have a power saving slope (shown at dashed line 330 in FIG. 3B) to further reduce the power consumption at coil 304. Specifically, the control circuit 308 is configured to adjust the duty cycle of the PWM signal applied to transistor switches Q2 and Q4 to re-configure the amplitude, slew rate of transition or the power saving slope of the coil current.

Consequently, the half-half topology 300 keeps the same power and cost advantages as the full-bridge topology 200 illustrated in FIGS. 2A and 2B. For example, the coil 304 may be used as a MST coil or a wireless power transfer coil. The full-bridge switching circuit 306 may be used as a switching circuit for wireless power transfer when the coil 304 is used as a power transfer coil. In addition, MST topology 300 only uses one EMI filter, further reducing the circuit cost.

Figure 4:
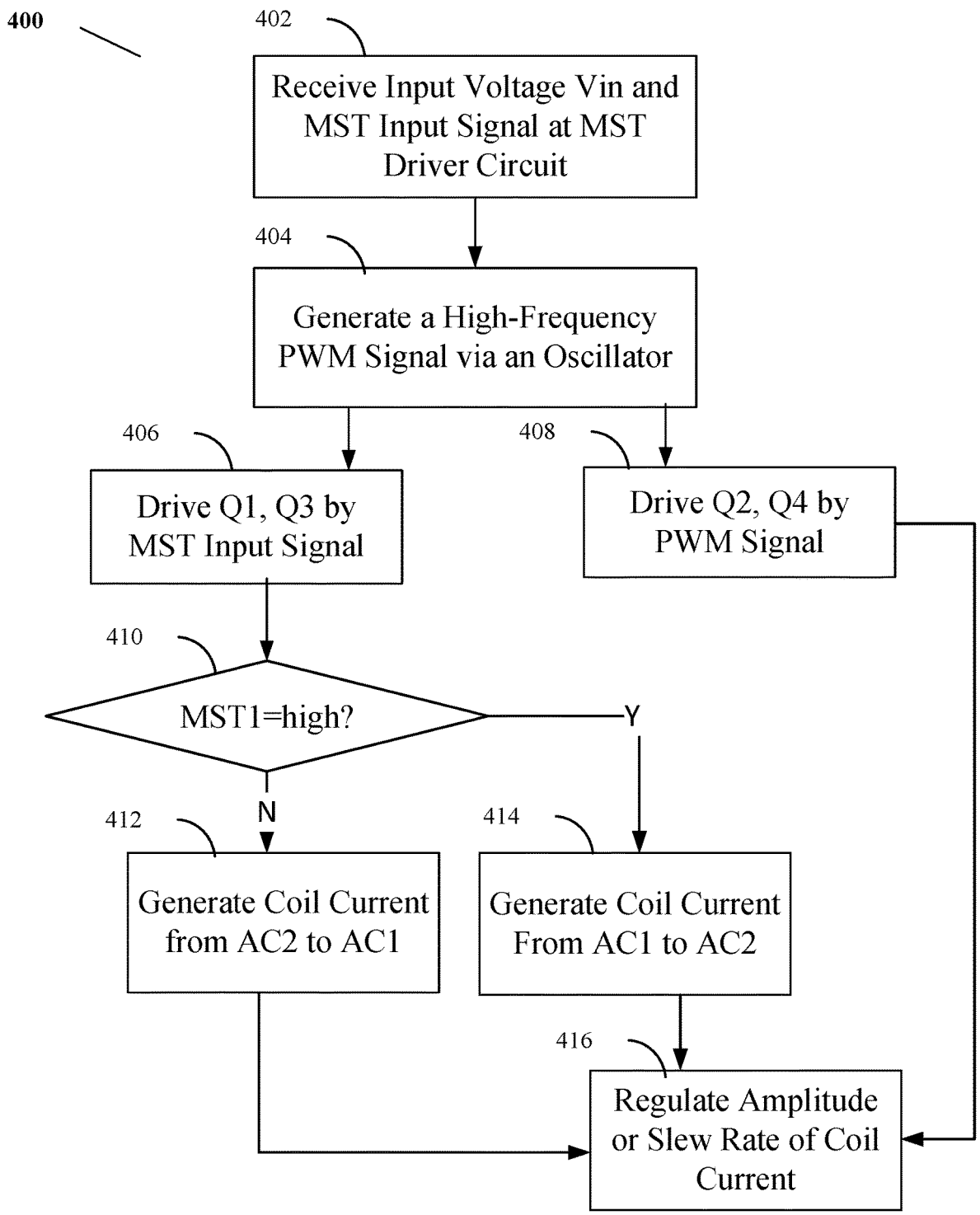
FIG. 4 is an example logic flow diagram illustrating an operation of the MST topology shown in FIG. 3A, according to some embodiments described herein.

FIG. 4 is an example logic flow diagram illustrating an operation 400 of the MST topology 300, according to some embodiments described herein. At step 402, an input voltage Vin and an MST input signal is received at the MST driver circuit (e.g., 302). At step 404, a high-frequency PWM signal is generated via an oscillator (e.g., 310). Steps 406 and 408 may be implemented separately, concurrently, jointly or sequentially. At step 406, the half-bridge of transistor switches Q1 and Q3 are driven by the MST input signal. At step 408, the half-bridge of transistor switches Q2 and Q4 are driven by the PWM signal.

At step 410, when the MST input signal is high, a coil current is generated from node AC1 to node AC2 at step 414. Or, when the MST input signal is not high, a coil current is generated from node AC2 to node AC1 at step 412. At step 416, the amplitude or the slew rate of transition of the coil current is regulated by the switching voltage at node AC2 under PWM control. Steps 402-416 may be repeated to operate the MST topology 300.

The above detailed description is provided to illustrate specific embodiments of the present invention and is not intended to be limiting. Numerous variations and modifications within the scope of the present invention are possible. The present invention is set forth in the following claims.

What is claimed is:

1. A magnetic secure transmission (MST) driver circuit, comprising:
 a first half-bridge component;
 a second half-bridge component coupled to the first half-bridge component to form a full-bridge component;
 a high-frequency oscillator configured to generate a pulse width modulation (PWM) signal; and
 a control circuit coupled to drive the first half-bridge component according to a MST input signal and concurrently drive the second half-bridge component according to the PWM signal,
 wherein a first voltage at the first half-bridge component switches between on and off according to a first frequency of the MST input signal, and a second voltage at the second half-bridge component switches between on and off according to a second frequency of the PWM signal that is greater than the first frequency.

2. The MST driver circuit of claim 1, wherein the first half-bridge component includes a first transistor switch and a second transistor switch coupled to the first transistor switch via a first connection node, and
 wherein the control circuit is configured to apply the MST input signal to a first gate of the first transistor switch, and an inversed version of the MST input signal to a second gate of the second transistor switch.

3. The MST driver circuit of claim 2, wherein the second half-bridge component includes a third transistor switch and a fourth transistor coupled to the third transistor switch via a second connection node, and
 wherein the control circuit is configured to apply the PWM signal to a third gate of the third transistor switch, and an inversed version of the PWM signal to a fourth gate of the fourth transistor switch.

4. The MST driver circuit of claim 3, wherein the first connection node is coupled to the second connection node via a coil.

5. The MST driver circuit of claim 4, wherein the coil is operated as a MST coil or a wireless power transfer coil.

6. The MST driver circuit of claim 5, wherein the full-bridge component is configured to operate as a wireless power transceiver using the coil as the wireless power transfer coil.

7. The MST driver circuit of claim 4, wherein the coil has a first current flowing from the first connection node to the second connection node when the MST input signal is high, and a second current flowing from the second connection node to the first connection node when the MST input signal is low.

8. The MST driver circuit of claim 7, wherein the second half-bridge component is configured to control an amplitude, a slew rate of transition, or a power saving slope of the first current or the second current flowing through the coil according to the PWM signal.

9. The MST driver circuit of claim 8, wherein the controlled amplitude, the controlled slew rate of transition, or the controlled power saving slope is reconfigurable through the control circuit.

10. A method for operating a magnetic secure transmission (MST) driver circuit, comprising:
generating, via a high-frequency oscillator, a pulse width modulation (PWM) signal;
driving, via a control circuit, a first half-bridge component according to a MST input signal; and
concurrently driving, via the control circuit, a second half-bridge component coupled to the first half-bridge component that form a full-bridge component, according to the PWM signal, wherein a first voltage at the first half-bridge component switches between on and off according to a first frequency of the MST input signal, and a second voltage at the second half-bridge component switches between on and off according to a second frequency of the PWM signal that is greater than the first frequency.

11. The method of claim 10, wherein the first half-bridge component includes a first transistor switch and a second transistor switch coupled to the first transistor switch via a first connection node, and the method comprises:
applying the MST input signal to a first gate of the first transistor switch, and an inversed version of the MST input signal to a second gate of the second transistor switch.

12. The method of claim 11, wherein the second half-bridge component includes a third transistor switch and a fourth transistor coupled to the third transistor switch via a second connection node, and the method comprises:
applying the PWM signal to a third gate of the third transistor switch, and an inversed version of the PWM signal to a fourth gate of the fourth transistor switch.

13. The method of claim 12, further comprising:
passing a current between the first connection node and the second connection node via a coil.

14. The method of claim 13, further comprising:
operating the coil as a MST coil or a wireless power transfer coil.

15. The method of claim 14, further comprising:
operating the full-bridge component as a wireless power transceiver using the coil as the wireless power transfer coil.

16. The method of claim 13, further comprising:
passing, via the coil, a first current flowing from the first connection node to the second connection node when the MST input signal is high; and
passing, via the coil, a second current flowing from the second connection node to the first connection node when the MST input signal is low.

17. The method of claim 16, further comprising:
controlling, via the second half-bridge component, an amplitude, a slew rate of transition, or a power saving slope of the first current or the second current flowing through the coil according to the PWM signal.

18. The method of claim 17, further comprising:
reconfiguring, through the control circuit, the controlled amplitude, the controlled slew rate of transition, or the controlled power saving slope.

* * * * *